(12) United States Patent
Zhou et al.

(10) Patent No.: US 12,416,517 B2
(45) Date of Patent: Sep. 16, 2025

(54) DEVICE FOR DOSING PARTICULATE MATERIAL

(71) Applicants: Yuanhao Zhou, Pittsburgh, PA (US); Zhengyang Liu, Pittsburgh, PA (US); Hong Chen, Pittsburgh, PA (US)

(72) Inventors: Yuanhao Zhou, Pittsburgh, PA (US); Zhengyang Liu, Pittsburgh, PA (US); Hong Chen, Pittsburgh, PA (US)

( * ) Notice: Subject to any disclaimer, the term of this patent is extended or adjusted under 35 U.S.C. 154(b) by 172 days.

(21) Appl. No.: 18/400,988

(22) Filed: Dec. 29, 2023

(65) Prior Publication Data

US 2025/0216239 A1    Jul. 3, 2025

(51) Int. Cl.
    *G01F 11/46*      (2006.01)

(52) U.S. Cl.
     CPC ................................ *G01F 11/46* (2013.01)

(58) Field of Classification Search
     CPC ........................ G01F 11/46; G01F 13/001
     See application file for complete search history.

(56) References Cited

U.S. PATENT DOCUMENTS

| | | | | |
|---|---|---|---|---|
| 2,084,764 A * | 6/1937 | Eusebe | ............. | B65G 53/4633 406/67 |
| 3,556,355 A * | 1/1971 | Ruiz | .............. | B65B 37/08 222/368 |
| 4,753,374 A * | 6/1988 | Jahn | .............. | B01J 8/002 222/414 |
| 5,044,837 A * | 9/1991 | Schmidt | ............ | B65G 53/4633 406/128 |
| 7,306,127 B2 * | 12/2007 | Eimer | ............... | B65D 47/0823 222/490 |
| 2008/0093391 A1 * | 4/2008 | Schwartz | ............. | G01F 13/001 222/368 |
| 2021/0190567 A1 * | 6/2021 | Nedved | ................ | A01C 7/081 |
| 2025/0216239 A1 * | 7/2025 | Zhou | .................... | G01F 13/001 |

FOREIGN PATENT DOCUMENTS

SE        523398 C2 *  4/2004 ............. D21C 7/06

* cited by examiner

*Primary Examiner* — Bob Zadeh
(74) *Attorney, Agent, or Firm* — Westbridge IP LLC

(57) ABSTRACT

A device for dosing particulate material uses multiple valve plates to collectively open or close a discharge port, so that an opening degree of the discharge port can be adjusted according to the degree to which the adjustment ends of each valve plate are gathered, thereby effectively adjusting the opening degree of the discharge port. When the amount of particulate material to be dosed is large, the opening degree of the discharge port can be increased accordingly to increase the discharge speed of the particulate material, shortening the discharge time and improving the efficiency of dosing. Furthermore, the opening degree of the discharge port can be adjusted to be adapted with particulate material of different volumes, such that larger particulate material can also smoothly pass through the discharge port to avoid blockage of the discharge port.

20 Claims, 6 Drawing Sheets

DEVICE FOR DOSING PARTICULATE MATERIAL

TECHNICAL FIELD

The present disclosure relates to the technology field for dosing particulate material, and more particularly, to a device for dosing particulate material.

BACKGROUND

In the laboratory and industrial R&D stages, the task of weighing and dosing for powders and particulate material is very common. However, in most laboratory and R&D scenarios, the weighing tasks are completed manually, which consumes valuable time and energy of researchers and developers. At present, a piston valve is used to control an opening and closing of a discharge port to control the dosing process for powders and particulate material. However, due to a fixed size of the discharge port, when the amount of powders and particulate material needed to be dosed is large, the dosing process may take a long time, which affects the dosing efficiency.

SUMMARY

The main purpose of the present disclosure is to provide a device for dosing particulate material, which aims to solve the technical problem of how to improve the dosing efficiency of the device for dosing particulate material.

To achieve the above purpose, the device for dosing particulate material provided in the present disclosure includes:

a dosing container with a discharge opening formed in a bottom thereof;

an opening adjustment mechanism including a plurality of valve plates rotatably mounted in the dosing container and distributed along a circumferential direction of the discharge port; each of the valve plates having an adjustment end capable of rotating with the valve plate to move towards or move away from a center of the discharge port; and the adjustment ends of the valve plates being configured to be gathered at the center of the discharge port to collectively close the discharge port and to be dispersed from the center of the discharge port to collectively open the discharge port.

In an embodiment, an inner wall surface of the bottom of the dosing container is spherical, and the valve plate is an arc-shaped plate adapted with the inner wall surface of the bottom of the dosing container, such that the valve plate can contact the inner wall surface of the bottom of the dosing container and rotate across the inner wall surface of the bottom of the dosing container.

In an embodiment, a shaft hole and an adjustment hole are defined in a peripheral wall of the dosing container, one end of the valve plate away from the adjustment end is connected to a rotation shaft and a transmission member, the rotation shaft rotatably engages with the shaft hole, the transmission member extends out of the dosing container through the adjustment hole, and the transmission member is driven by an external power to drive the valve plate to rotate around the rotation shaft.

In an embodiment, the opening adjustment mechanism further includes an adjuster movably sleeved on the dosing container to move along a height direction of the dosing container, and the adjuster is connected to the transmission member or abuts the transmission member to drive the transmission member to move.

In an embodiment, the adjuster includes an adjustment sleeve and an adjustment ring, the adjustment sleeve is movably sleeved on the dosing container, the adjustment ring is sleeved on the dosing container and is connected to the adjustment sleeve at intervals to move with the adjustment sleeve, and the transmission member is located between the adjustment sleeve and the adjustment ring and abuts the adjustment sleeve and the adjustment ring.

In an embodiment, the adjuster is threaded to the dosing container.

In an embodiment, the opening adjustment mechanism further includes an adjustment gear connected to the adjuster for meshing with the adjustment gear to drive the adjustment gear.

In an embodiment, a thickness of a side of the valve plate gradually decreases towards an edge thereof, and the sides of two adjacent valve plates are overlapped with each other.

In an embodiment, a fitting groove is formed in one side of the valve plate, and the side of each valve plate slidably engages with the fitting groove of the adjacent valve plate.

In an embodiment, the device for dosing particulate material further includes a vibrator abutting the dosing container or connected to the dosing container.

In the technical solution of the device for dosing particulate material of the present disclosure, the discharge port is opened or closed by the multiple valve plates, such that the opening degree of the discharge port can be adjusted according to the degree to which the adjustment ends of the valve plate are gathered, thereby effectively adjusting the opening degree of the discharge port. When the amount of particulate material to be dosed is large, the opening degree of the discharge port can be increased accordingly to increase a discharge speed of the particulate material, which shortens the discharge time and improves the dosing efficiency. Furthermore, the opening degree of the discharge port can be adjusted to be adapted with particulate material of different volumes, such that larger particulate material can also pass through the discharge port smoothly, avoiding blockage of the discharge port. In addition, since the multiple valve plate can collectively control the opening degree of the discharge port, the control accuracy of the opening degree of the discharge port can be improved, which allows for a more accurate control of the amount of the particulate material to be dosed and improves the dosing accuracy.

BRIEF DESCRIPTION OF THE DRAWINGS

In order to explain the technical solutions in the embodiments of the present disclosure or the prior art more clearly, the drawings used by the description of the embodiments or the prior art will be briefly introduced below. Obviously, the drawings in the following description may be merely some embodiments of the present disclosure. For those of ordinary skilled in the art, other drawings may be obtained according to the structures shown in the drawings without creative effort.

Figure 1:
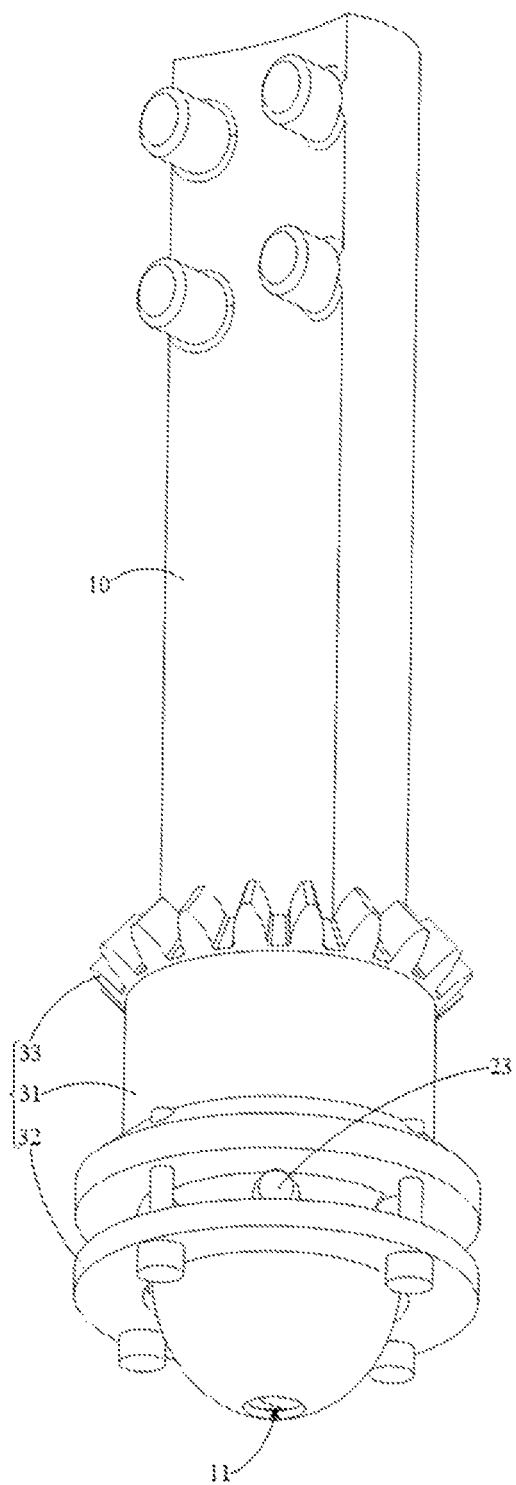
FIG. 1 is a schematic diagram of a device for dosing particulate material in accordance with an embodiment of the present disclosure.

The realization of the purpose, functional features and advantages of the present application will be further described with reference to the accompanying drawings in conjunction with the embodiments.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments may be only a part of the embodiments of the present disclosure, but not all of the embodiments. Based on the embodiments of the present disclosure, all other embodiments obtained by those of ordinary skilled in the art without creative effort shall fall within the protection scope of the present disclosure.

It is to be understood that, all of the directional instructions in the exemplary embodiments of the present disclosure (such as top, down, left, right, front, back . . . ) can only be used for explaining relative position relations, moving condition of the elements under a form (referring to figures), and so on, if the form changes, the directional instructions changes accordingly.

In addition, descriptions such as "first" and "second" in the present disclosure may be for descriptive purposes only, and cannot be understood as indicating or implying the relative importance or implicitly indicating the number of indicated technical features. Therefore, the features defined as "first" and "second" may explicitly or implicitly include at least one of the features. In addition, the meaning of "and/or" appearing in the context means including three parallel solutions, taking "A and/or B" as an example, "A and/or B" includes only solution A, or only solution B, or both solutions A and B. In addition, the technical solutions among the various embodiments can be combined with each other, but the combinations must be based on what can be achieved by those of ordinary skill in the art. When a combination of technical solutions is contradictory or cannot be achieved, it should be considered that such a combination of technical solutions does not exist and is not within the protection scope claimed by the present application.

In the laboratory and industrial R&D stages, the task of weighing and dosing for powders and particulate material is very common. However, in most laboratory and R&D scenarios, the weighing tasks are completed manually, which consumes valuable time and energy of scientific researchers and developers. At present, the opening and closing of the discharge port 11 are controlled through a piston valve to control the dosing process of powders and particulate material. However, due to a fixed size of the discharge port 11, when the amount of powders and particulate material needed to be dosed is large, the dosing process may take a long time, which affects the dosing efficiency.

The present disclosure provides a device for dosing particulate material, aiming to solve the technical problem of how to improve the dosing efficiency of the device for dosing particulate material.

Figure 2:
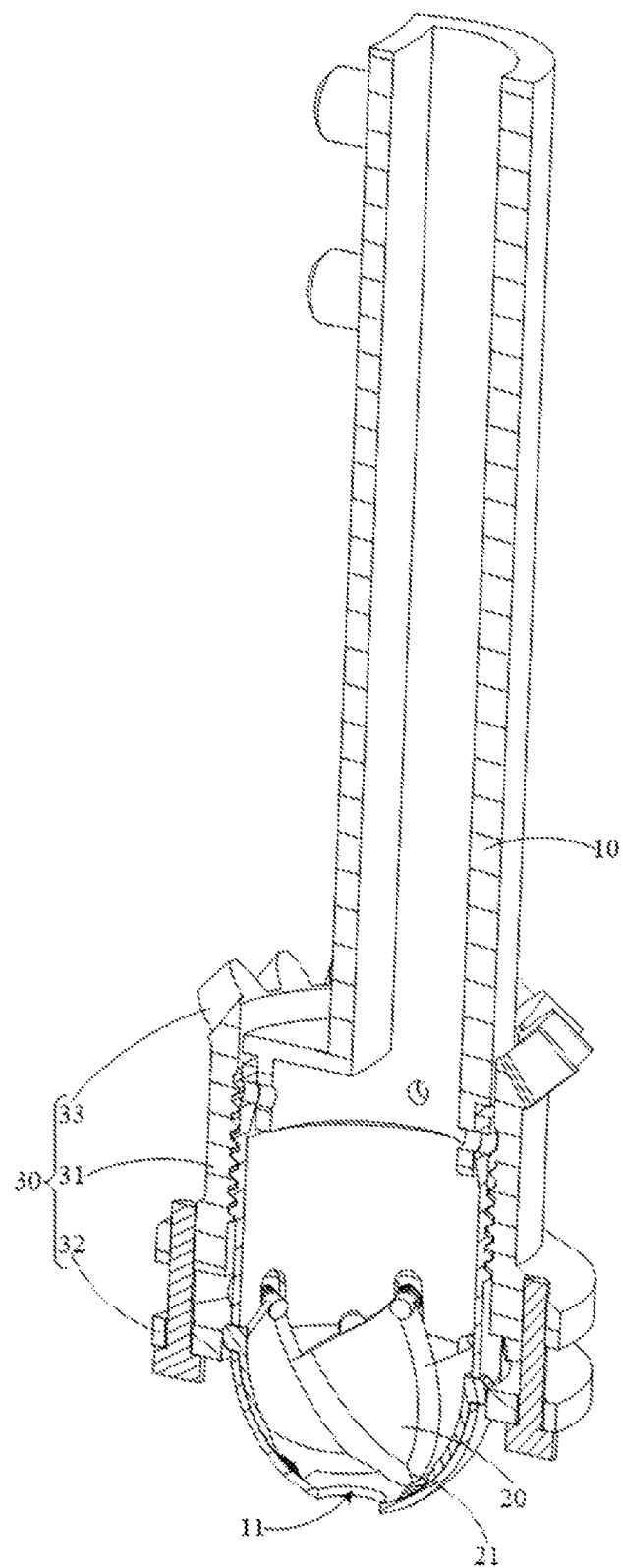
FIG. 2 is a cross-section view of a device for dosing particulate material in accordance with an embodiment of the present disclosure.
Figure 3:
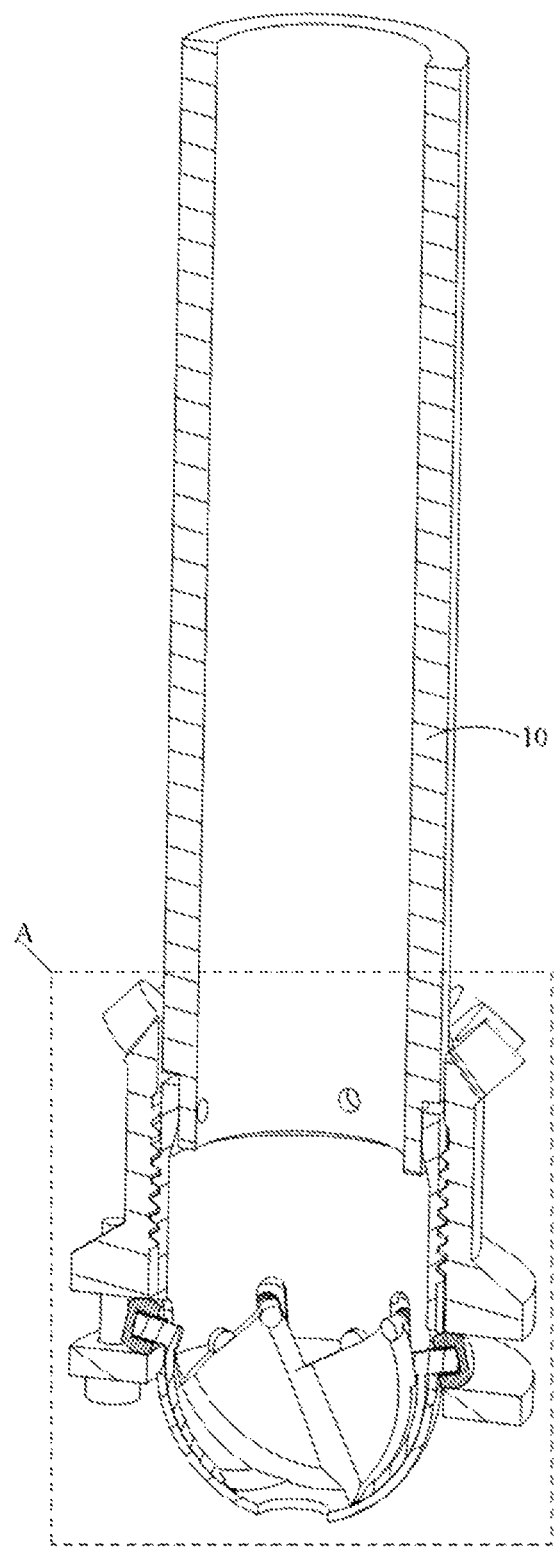
FIG. 3 is a cross-section view of a device for dosing particulate material in accordance with another embodiment of the present disclosure.
Figure 4:
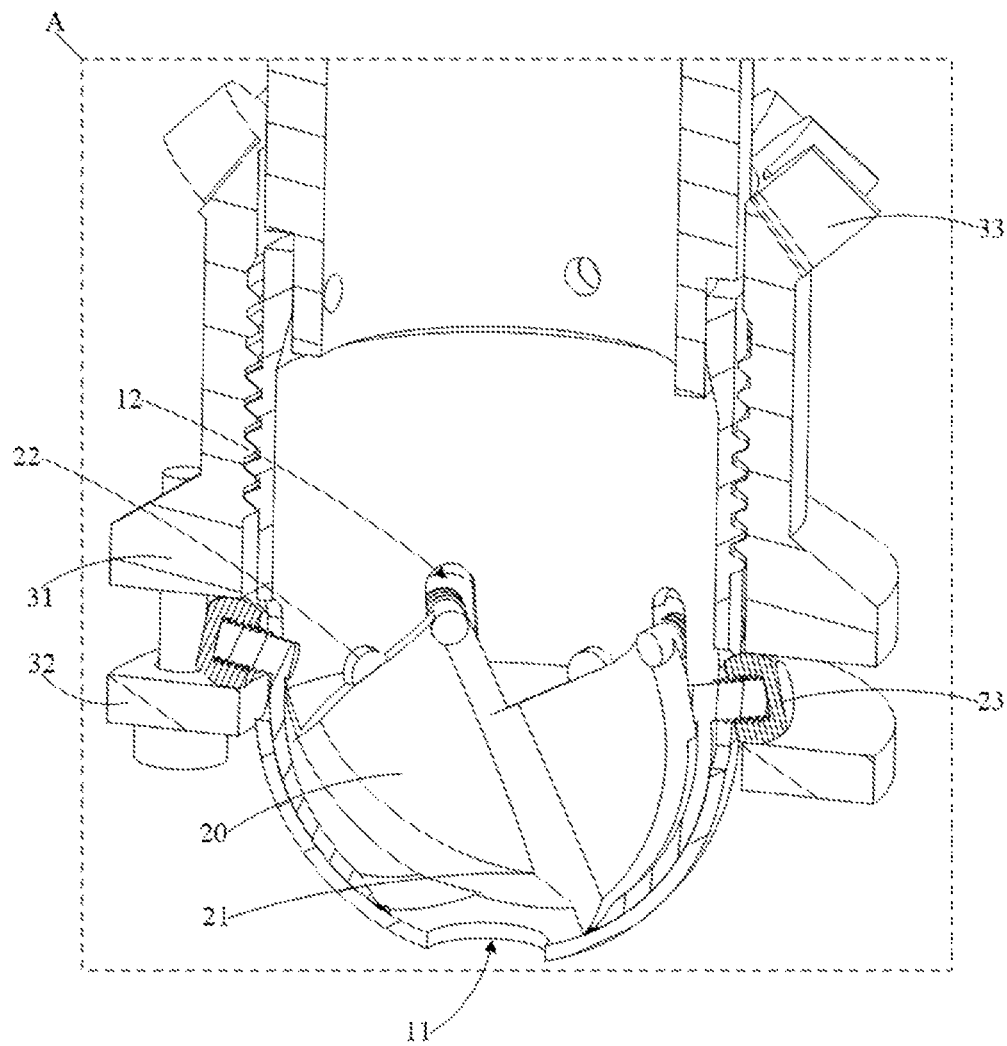
FIG. 4 is a partially-enlarged view of part A in FIG. 3.
Figure 5:
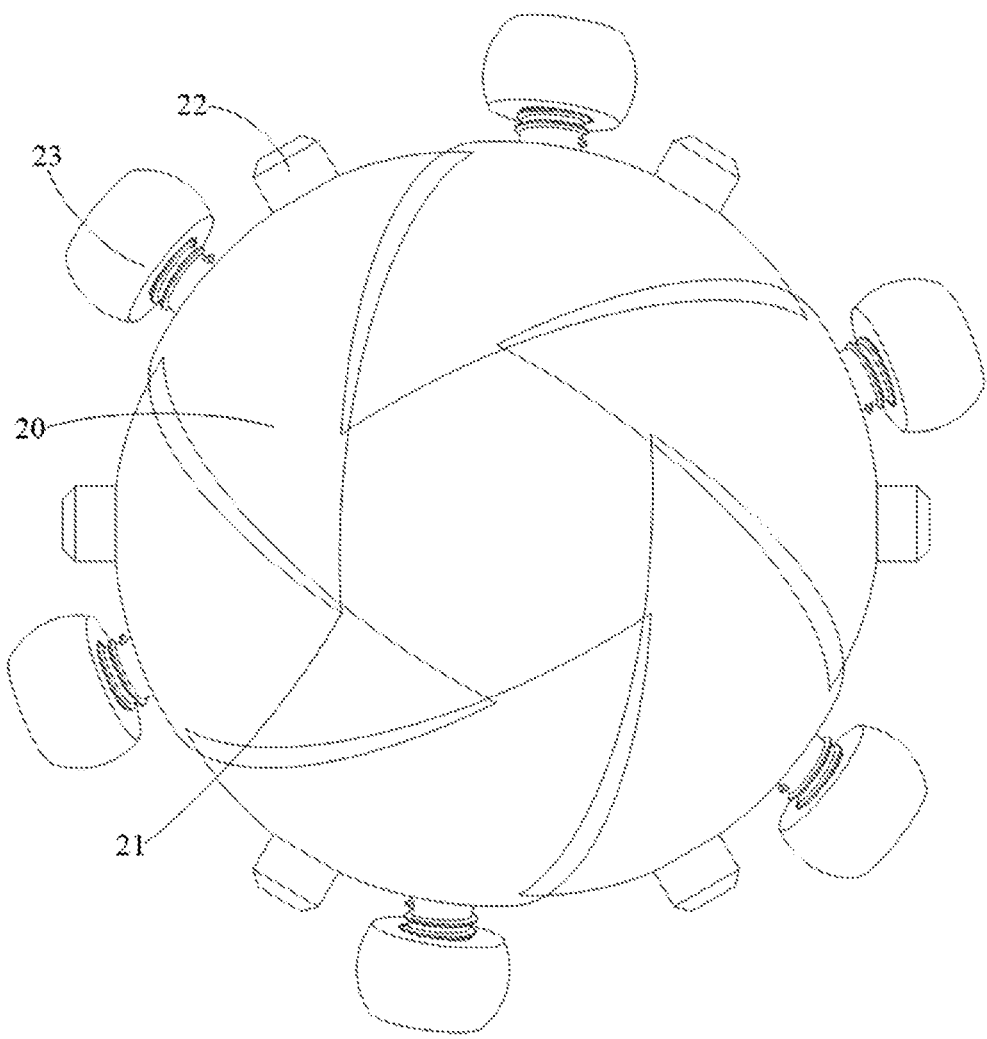
FIG. 5 is a schematic diagram of an opening adjustment mechanism in accordance with an embodiment of the present disclosure.

FIG. 1 is a schematic diagram of the device for dosing particulate material in accordance with an embodiment of the present disclosure; FIG. 2 is a schematic diagram of the device for dosing particulate material in accordance with another embodiment of the present disclosure; FIG. 3 is a cross-section view of a device for dosing particulate material in accordance with another embodiment of the present disclosure; FIG. 4 is a partially-enlarged view of part A in FIG. 3; and FIG. 5 is a schematic diagram of an opening adjustment mechanism in accordance with an embodiment of the present disclosure.

The device for dosing particulate material includes a dosing container 10 and an opening adjustment mechanism. A discharge port 11 is formed in a bottom of the dosing container 10. The opening adjustment mechanism includes a plurality of valve plates 20 rotatably mounted in the dosing container 10 and distributed along a circumference of the discharge port 11. Each valve plate 20 has an adjustment end 21 capable of rotating with the valve plate 20 to move towards or move away from a center of the discharge port 11. The adjustment ends 21 of the valve plates 20 are configured to be gathered at the center of the discharge port 11 to collectively close the discharge port 11, and to be dispersed from the center of the discharge port 11 to collectively open the discharge port 11.

In this embodiment, the dosing container 10 is configured to store powders or particulate material. The dosing container 10 can be shaped as a bottle, such as a cylindrical bottle, a rectangular bottle, and a shaped bottle, which is not limited hereinafter. The discharge port 11 is located at the bottom of the dosing container 10 to allow the particulate material to fall out of the dosing container 10 for weighing and usage. The opening adjustment mechanism can adjust an opening degree of the discharge port 11; in an embodiment, the opening adjustment mechanism can gradually open the discharge port 11 to a fully-opened state from a fully-closed state. A width of the valve plate 20 gradually decreases from an end thereof away from the adjustment end 21 towards the adjustment end 21. When the adjustment end 21 rotates with the valve plate 20 to the center of the discharge port 11, the adjustment end 21 covers a part of the discharge port 11; when the adjustment end 21 rotates with the valve plate 20 to get away from the center of the discharge port 11, the adjustment end 21 opens a part of the discharge port 11. When the adjustment ends 21 of the valve plates 20 are gathered at the center of the discharge port 11, the adjustment ends 21 can collectively close the discharge port 11; when the adjustment ends 21 of the valve plates 20 are dispersed from the center of the discharge port 11, the adjustment ends 21 can gradually open the discharge port 11. In this way, by controlling a rotation distance of each valve plate 20, a covering area of the adjustment end 21 of each valve plate 20 on the discharge port 11 can be controlled, allowing the opening degree of the discharge port 11 to be adjusted.

When the amount of particulate material to be dosed is large, the device can increase the opening degree of the discharge port 11 by controlling the opening adjustment mechanism to increase the discharge speed of the particulate material, thereby improving the dosing efficiency. When the amount of the dosed particulate material is close to a preset weight, the device can reduce the opening degree of the discharge port 11 by controlling the opening adjustment mechanism to reduce the discharge speed of the particulate material, thereby reducing a weight increasing speed of the dosed particulate material. Thus, the discharge port 11 can be closed faster when the amount of the dosed particulate material reaches the preset weight, such that the discharge of particulate material can be stopped faster, thereby reducing the weighing error of the dosed particulate material and improving the accuracy of the dosing of the particulate material. Furthermore, the opening degree of the discharge port 11 can be adjusted to be adapted with particulate material of different volumes, such that larger particulate material can also smoothly pass through the discharge port 11 to avoid blockage of the discharge port 11. In addition, since the valve plates 20 can collectively control the opening degree of the discharge port 11, the control accuracy of the opening degree of the discharge port 11 can be improved, which allows for a more accurate control of the amount of the particulate material to be dosed and improves the dosing accuracy.

The valve plate 20 can be a flat plate or an arc plate.

Figure 6:
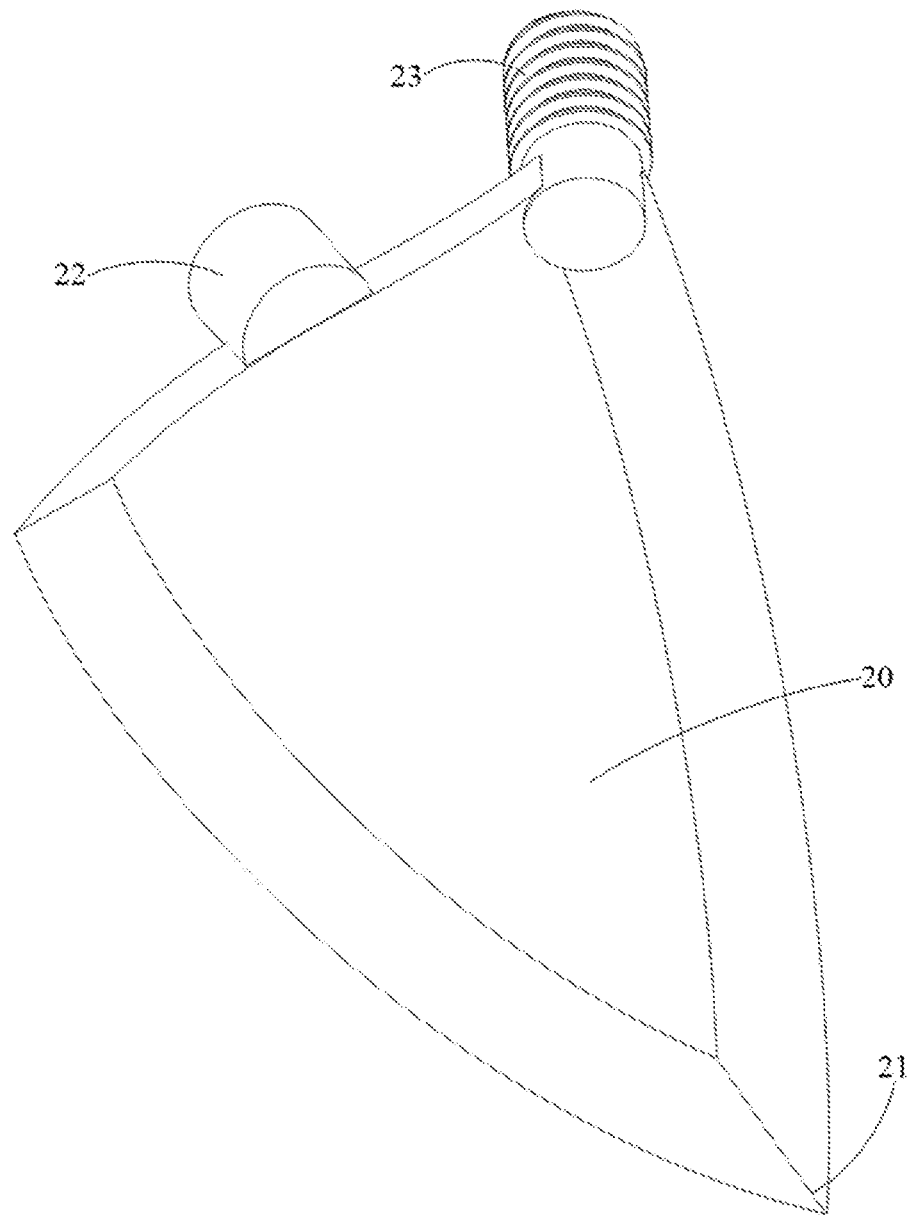
FIG. 6 is a schematic diagram of a valve plate in accordance with an embodiment of the present disclosure.

FIG. 6 is a schematic diagram of the valve plate 20 in accordance with an embodiment of the present disclosure. An inner wall surface of the bottom of the dosing container 10 is spherical, and the valve plate 20 is an arc-shaped plate adapted with the spherical inner wall surface, thus, the valve plate 20 can contact the inner wall surface of the bottom of the dosing container 10 and rotate across the inner wall surface of the bottom of the dosing container 10.

The inner wall surface of the bottom of the dosing container 10 is set to be spherical, and the discharge port 11 is opened at the bottom of the spherical inner wall surface, thus, the particulate material in the dosing container 10 can always flow towards the discharge port 11 under the action of gravity to ensure the discharge speed each time. The shape of the valve plate 20 is adapted with the inner wall surface of the bottom of the dosing container 10, and an outer diameter of the valve plate 20 is consistent with an inner diameter of the bottom of the dosing container 10, that is, the valve plate 20 can be treated as a part cut from the spherical inner wall surface. In this way, the valve plate 20 can abut the inner wall surface of the bottom of the dosing container 10 during rotating, which reduces a space occupied by the valve plate 20 in the dosing container 10 and reduces a resistance caused by the movement of the particulate material to the valve plate 20, thus, the process of adjusting the opening degree of the discharge port 11 by the valve plates 20 is more smooth. Since the valve plate 20 is an arc-shaped plate adapted with the bottom of the dosing container 10, when the adjustment ends 21 of the valve plates 20 are gathered at the center of the discharge port 11, the valve plates 20 collectively form a spherical surface, which fully closes the discharge port 11 to prevent leakage of the particulate material.

In practical applications, as shown in FIGS. 2 to 4 and FIG. 6, a shaft hole and an adjustment hole 12 are defined in a peripheral wall of the dosing container 10, and an end of each valve plate 20 away from the adjustment end 21 is connected to a rotation shaft 22 and a transmission member 23. The rotation shaft 22 rotatably engages with the shaft hole, and the transmission member 23 extends out of the dosing container 10 through the adjustment hole 12. The transmission member 23 is configured to be driven by an external power to rotate the valve plate 20 around the rotation shaft 22.

The valve plate 20 can rotate around the rotation shaft 22 as a whole, and the external power can drive the transmission member 23 to move from the outside of the dosing container 10 to rotate the valve plate 20. It can be understood that a movement trajectory of the transmission member 23 is arc-shaped, thus a shape and a size of the adjustment hole 12 should be adapted with a movement range of the transmission member 23 to enable the transmission member 23 to effectively rotate around the rotation shaft 22, thereby driving the valve plate 20 to rotate around the rotation shaft 22.

In an embodiment, a plurality of shaft holes are defined, and the shaft holes are arranged at intervals along the circumferential direction of the dosing container 10. The rotation shaft 22 of each valve plate 20 is rotatably adapted with each shaft hole. Correspondingly, a plurality of adjustment holes 12 are defined, and the adjustment holes 12 are arranged at intervals along the circumferential direction of the dosing container 10. The transmission member 23 of each valve plate 20 extends out of the dosing container 10 through the corresponding adjustment hole 12.

As shown in FIG. 3 and FIG. 4, the opening adjustment mechanism also includes an adjuster 30 movably sleeved on the dosing container 10 to move along a height direction of the dosing container 10. The adjuster 30 is connected to the transmission members 23 or abuts the transmission members 23 to drive the transmission members 23 to move. The adjuster 30 also abuts the transmission members 23, thus, when the adjuster 30 moves, the transmission members 23 are driven to move as well by the adjuster 30, which allows valve plates 20 to rotate synchronously.

In an embodiment, as shown in FIG. 3 and FIG. 4, the adjuster 30 includes an adjustment sleeve 31 and an adjustment ring 32. The adjustment sleeve 31 can be movably sleeved on the dosing container 10, and the adjustment ring 32 is sleeved on the dosing container 10 and connected to the adjustment sleeve 31 at intervals to move with the adjustment sleeve 31. The transmission member 23 is located between the adjustment sleeve 31 and the adjustment ring 32, and abuts the adjustment sleeve 31 and the adjustment ring 32.

The adjustment sleeve 31 and the adjustment ring 32 clamp the transmission member 23. When the adjustment sleeve 31 moves towards the transmission member 23 to push the transmission member 23, the transmission member 23 drives the valve plate 20 to rotate under the pressure of the adjustment sleeve 31, such that the valve plate 20 gradually opens/closes the discharge port 11. When the adjustment sleeve 31 moves away from the transmission member 23, the adjustment ring 32 pushes the transmission member 23, and the transmission member 23 drives the valve plate 20 to rotate under the pressure of the adjustment ring 32, such that the valve plate 20 gradually closes/opens the discharge port 11. By clamping the transmission member 23 between the adjustment sleeve 31 and the adjustment ring 32, the influence of an external structure on the transmission member 23 can be reduced, thereby improving the stability of the control process of the valve plate 20.

The movement of the adjuster 30 can be a linear movement or a helical movement.

For example, as shown in FIG. 3 and FIG. 4, the adjuster 30 is threaded to the dosing container 10. In combination with the embodiment of the adjustment sleeve 31 described above, an inner peripheral wall of the adjustment sleeve 31 is provided with internal threads, and an outer peripheral wall of the dosing container 10 is provided with external threads engaging with the external threads to achieve the threaded engagement between the adjustment sleeve 31 and the dosing container 10. By driving the adjuster 30 to rotate, a position of the adjuster 30 along the height direction of the dosing container 10 can be changed. Compared to the controlling process of the linear movement of the adjuster 30, the controlling process of the rotation of the adjuster 30 is easier. By controlling a rotation angle or a rotation distance of the adjuster 30 each time, it is convenient to control a position change of the adjuster 30 along the height direction of the dosing container 10 each time, thereby controlling a change of the opening degree of the discharge port 11 each time by the valve plate 20, allowing the adjustment of the opening degree of the discharge port 11 to be more precise and improving the dosing accuracy of the particulate material.

In another embodiment, the adjuster 30 can also be driven through a ball screw structure, which is not limited hereinafter.

In an embodiment, as shown in FIG. 3 and FIG. 4, the opening adjustment mechanism also includes an adjustment gear 33 connected to the adjuster 30 for meshing with a driving gear and being driven by the driving gear. The adjustment gear 33 can be connected to an end of the adjustment sleeve 31 away from the transmission member 23, and mesh with the adjustment sleeve 21 to drive the adjustment sleeve 31 to rotate, which simplifies the driving process of the adjustment sleeve 31 and improves the driving accuracy.

In practical applications, the adjustment gear 33 can be set as a bevel gear and an axis of the driving gear can be perpendicular to an axis of the adjustment gear 33, allowing for a larger installation space for the driving gear and a driving motor and facilitating the installation.

When the adjustment ends 21 of the valve plates 20 are gathered at the center of the discharge port 11, sides of adjacent two valve plates 20 may abut each other, may be overlapped with each other, or may be slidably fitted into each other, without limitation.

For example, as shown in FIG. 5 and FIG. 6, a thickness of the side of the valve plate 20 gradually decreases towards an edge thereof, and the sides of two adjacent valve plates 20 are overlapped with each other. The thickness of the two long sides of the valve plate 20 gradually decrease, which reduces the difficulty of overlapping the sides of two adjacent valve plates 20, allowing the sides of two adjacent valve plates 20 to be effectively overlapped with each other. After the sides are overlapped with each other, particulate material can be prevented from leaking from the gap between two adjacent valve plates 20, improving the complete closure effect of the opening adjustment mechanism on the discharge port 11.

In another embodiment, one side of the valve plate 20 is provided with a fitting groove, and the side of each valve plate 20 slidably engages with the fitting groove of the adjacent valve plate 20. The fitting groove extends along a length direction of the side of the valve plate 20, and the two adjacent valve plates 20 slidably engages with the fitting groove, which can prevent particulate material from leaking from the gap between the two adjacent valve plates 20, thereby improving the complete closure effect of the opening adjustment mechanism on the discharge port 11.

For large-volume particulate material or particulate material with viscosity, if no external power is applied, the particulate material is easily blocked at the discharge port 11, causing difficulty in dosing the particulate material.

In an embodiment, the device for dosing particulate material also includes a vibrator, which abuts the dosing container 10 or is connected to the dosing container 10. The vibrator can be a vibrating motor or an ultrasonic homogenizer, which is not limited hereinafter. The vibrator is capable of vibrating the particulate material in the dosing container 10 such that the particulate material can smoothly pass through the discharge port 11. In this way, the particulate material can more easily pass through the discharge port 11, thereby improving the dosing efficiency of the device for dosing particulate material.

In the technical solution of the device for dosing particulate material of the present disclosure, the multiple valve plates 20 can collectively open or close the discharge port 11, such that the opening degree of the discharge port 11 can be adjusted according to the degree to which the adjustment ends 21 of the valve plates 20 are gathered, thereby effectively adjusting the opening degree of the discharge port 11. When the amount of particulate material to be dosed is large, the opening degree of the discharge port 11 can be increased accordingly to increase the discharge speed of the particulate material, which shortens the discharge time and improves the dosing efficiency. Furthermore, the opening degree of the discharge port 11 can be adjusted to be adapted with particulate material of different volumes, such that larger particulate material can also smoothly pass through the discharge port 11 to avoid blockage of the discharge port 11. In addition, since the valve plates 20 collectively control the opening degree of the discharge port 11, the control accuracy of the opening degree of the discharge port 11 can be improved, which more accurately controls the amount of particulate material to be dosed and improves the dosing accuracy.

The above descriptions are only optional embodiments of the application, and do not limit the scope of the patents of the present application. All the equivalent structural transformations made by the content of the specification and drawings of the present application under the creative concept of the present application, or directly/indirectly used in other related technical fields are all included in the protection scope of the patents of the present application.

What is claimed is:

1. A device for dispensing particulate material, comprising:
   a container with a discharge port formed in a bottom of the container;
   an opening adjustment mechanism comprising multiple valve plates rotatably mounted in the container and distributed along a circumferential direction of the discharge port; each of the valve plates having an adjustment end capable of rotating with each of the valve plates to move towards or move away from a center of the discharge port; and the adjustment ends of the valve plates being configured to be gathered at the center of the discharge port to collectively close the discharge port and to be dispersed from the center of the discharge port to collectively open the discharge port.

2. The device for dispensing particulate material according to claim 1, wherein an inner wall surface of the bottom of the container is spherical, and each of the valve plates is an arc-shaped plate adapted with the inner wall surface of the bottom of the container, such that each of the valve plates is capable of contacting the inner wall surface of the bottom of the container and rotate across the inner wall surface of the bottom of the container.

3. The device for dispensing particulate material according to claim 2, wherein a shaft hole and an adjustment hole are defined in a peripheral wall of the container, one end of each of the valve plates away from the adjustment end is connected to a rotation shaft and a transmission member, the rotation shaft rotatably engages with the shaft hole, the transmission member extends out of the container through the adjustment hole, and the transmission member is driven by an external power to drive each of the valve plates to rotate around the rotation shaft.

4. The device for dispensing particulate material according to claim 3, wherein the opening adjustment mechanism further comprises an adjuster movably sleeved on the container to move along a height direction of the container, and the adjuster is connected to the transmission member or abuts the transmission member to drive the transmission member to move.

5. The device for dispensing particulate material according to claim 4, wherein the adjuster comprises an adjustment sleeve and an adjustment ring, the adjustment sleeve is movably sleeved on the container, the adjustment ring is sleeved on the container and is connected to the adjustment sleeve at intervals to move with the adjustment sleeve, and the transmission member is located between the adjustment sleeve and the adjustment ring and abuts the adjustment sleeve and the adjustment ring.

6. The device for dispensing particulate material according to claim 4, wherein the adjuster is threaded to the container.

7. The device for dispensing particulate material according to claim 6, wherein the opening adjustment mechanism further comprises an adjustment gear connected to the adjuster for meshing with the adjustment gear to drive the adjustment gear.

8. The device for dispensing particulate material according to claim 4, wherein a thickness of the side of each of the valve plates gradually decreases from a middle of the side towards an edge of the side, and sides of two adjacent valve plates are overlapped with each other.

9. The device for dispensing particulate material according to claim 5, wherein the adjuster is threaded to the container.

10. The device for dispensing particulate material according to claim 4, wherein a fitting groove is formed in one side of each of the valve plates, and the side of each of the valve plates slidably engages with the fitting groove of the adjacent valve plates.

11. The device for dispensing particulate material according to claim 4, further comprising a vibrator abutting the container or connected to the container.

12. The device for dispensing particulate material according to claim 2, wherein a thickness of the side of each of the valve plates gradually decreases from a middle of the side towards an edge of the side, and sides of two adjacent valve plates are overlapped with each other.

13. The device for dispensing particulate material according to claim 2, wherein a fitting groove is formed in one side of each of the valve plates, and the side of each of the valve plates slidably engages with the fitting groove of the adjacent valve plates.

14. The device for dispensing particulate material according to claim 2, further comprising a vibrator abutting the container or connected to the container.

15. The device for dispensing particulate material according to claim 3, wherein a thickness of the side of each of the valve plates gradually decreases from a middle of the side towards an edge of the side, and sides of two adjacent valve plates are overlapped with each other.

16. The device for dispensing particulate material according to claim 3, wherein a fitting groove is formed in one side of each of the valve plates, and the side of each of the valve plates slidably engages with the fitting groove of the adjacent valve plates.

17. The device for dispensing particulate material according to claim 3, further comprising a vibrator abutting the container or connected to the container.

18. The device for dispensing particulate material according to claim 1, wherein a thickness of the side of each of the valve plates gradually decreases from a middle of the side towards an edge of the side, and sides of two adjacent valve plates are overlapped with each other.

19. The device for dispensing particulate material according to claim 1, wherein a fitting groove is formed in one side of each of the valve plates, and the side of each of the valve plates slidably engages with the fitting groove of the adjacent valve plates.

20. The device for dispensing particulate material according to claim 1, further comprising a vibrator abutting the container or connected to the container.

* * * * *